United States Patent [19]

Lehmann et al.

[11] Patent Number: 5,389,264
[45] Date of Patent: Feb. 14, 1995

[54] HYDRAULIC ENERGY DISSIPATOR FOR WET OXIDATION PROCESS

[75] Inventors: Richard W. Lehmann, Rib Mountain; Mark A. Clark, Schofield, both of Wis.

[73] Assignee: Zimpro Environmental Inc., Rothschild, Wis.

[21] Appl. No.: 89,463

[22] Filed: Jul. 12, 1993

[51] Int. Cl.$^6$ .............................................. B01D 19/00
[52] U.S. Cl. .................................. 210/744; 96/194; 96/205; 137/587; 210/188; 210/761
[58] Field of Search ................. 95/24, 260, 266; 96/157, 194, 204, 205, 201; 210/104, 109, 180, 188, 744, 761, 767, 774, 808; 137/587

[56] References Cited

U.S. PATENT DOCUMENTS

| | | | |
|---|---|---|---|
| 688,256 | 12/1901 | Mitchell | 137/587 |
| 3,150,105 | 9/1964 | Ledding | 252/416 |
| 3,661,778 | 5/1972 | Pradt | 210/761 |
| 3,994,702 | 11/1976 | Schweimanns et al. | 48/197 R |
| 4,384,959 | 5/1983 | Bauer et al. | 210/761 |
| 4,620,563 | 11/1986 | Meidl et al. | 137/572 |
| 5,011,114 | 4/1991 | Depuydt et al. | 251/144 |
| 5,052,426 | 10/1991 | Kasper | 137/587 |
| 5,240,619 | 8/1993 | Copa et al. | 210/761 |

FOREIGN PATENT DOCUMENTS

| | | | |
|---|---|---|---|
| 1-284391 | 11/1989 | Japan | 210/761 |
| 2236692 | 4/1991 | United Kingdom | 210/188 |

Primary Examiner—Joseph W. Drodge
Attorney, Agent, or Firm—Tipton L. Randall

[57] ABSTRACT

This invention relates to a process and apparatus for dissipating the energy of a wet oxidation mixture after that stream traverses a pressure control valve. The depressurized stream is discharged into a phase separator vessel containing a gas phase and a liquid phase. The pressure control valve is positioned to discharge the oxidation mixture at a selected orientation below the surface level of the liquid phase in the vessel. This dissipates the energy of the mixture and prevents erosion of the phase separator vessel. The apparatus of the invention includes the separator vessel with gas and liquid phase exits, a control device for maintaining the liquid phase at the selected level in the vessel, a pressure control valve positioned at an aperture in the vessel for discharging the mixture below the surface level of the liquid phase in the vessel, and sealing device between the control valve and the separator vessel.

6 Claims, 2 Drawing Sheets

HYDRAULIC ENERGY DISSIPATOR FOR WET OXIDATION PROCESS

BACKGROUND OF THE INVENTION

1. Field of the Invention

This invention relates to a process and apparatus for dissipating the energy of a pressurized stream as that stream traverses a pressure control valve, and more particularly, to dissipating the energy of a wet oxidation mixture after that stream traverses a pressure control valve.

2. Description of Related Art

Wet oxidation is a well known process for treatment of aqueous wastewaters. The process involves heating a mixture of the wastewater plus an oxygen-containing gas to elevated temperature and pressure to effect oxidation of oxidizable substances contained in the wastewater. All wet oxidation systems include one or more pressure control valves to regulate the flow of liquid, solids and gases from the high pressure part of the system to the low pressure part of the system. Depending on the composition of the process stream and the temperature and pressure of the flowing stream, the pressure control valve discharge can be highly abrasive to the piping and receiving vessel on the low pressure side. The process stream velocity is commonly at or close to sonic velocity due to the high pressure drop across the pressure control valve. There will be steam flashing at the control valve outlet if the process stream temperature is close to the vapor pressure of water. The wet oxidation system process stream commonly contains significant concentrations of suspended solids. The combination of suspended solids, flashing steam, and high velocity makes the pressure control valve effluent extremely abrasive.

Presently, a specially designed pressure control valve and receiving pot combination are employed to minimize the effects of abrasion on the low pressure side of the system. The receiving pot is typically small in diameter and includes special wear resistant materials that can stand up to highly abrasive conditions for long periods of time. The total process stream sweeps through the receiving pot and on to a standard phase separator vessel. It is difficult to determine the correct size for a receiving pot and there are still applications where the current pot design fails due to unknown and/or uncontrollable process factors.

Ledding, in U.S. Pat. No. 3,150,105, discloses a blow down tank or other suitable decompression vessel which receives the cooled regenerated carbon slurry from a wet oxidation reactor. No further description of the blow down tank is provided.

In U.S. Pat. No. 3,994,702, Schweimanns et al. disclose a flooded slucing chamber for ash removal from a pressurized gasification chamber.

Meidl et al., in U.S. Pat. No. 4,620,563 disclose a blowdown pot with an inlet pressure control valve through which the pot receives unwanted residue e.g., ash from a high pressure chemical reactor. This reactor residue can be continuously or semi-continuously blown out from the high pressure, high temperature chemical reactor into the relatively low pressure blowdown pot which includes means for maintaining a liquid level therein, thus minimizing steam flashing and vessel wear.

In U.S. Pat. No. 5,011,114, Depuydt et al. disclose a pressure control valve with a valve seat and support assembly which extends beyond the valve body to prevent erosion by the blowdown slurry. The apparatus also includes a displacement-compensating seal between the valve and receiving vessel to allow for thermal expansion and contraction during the blowdown cycle while maintaining the integrity of the seal.

In general, these references disclose methods and/or apparatus for handling only a fraction of the total process stream passing through a wet oxidation treatment system. The receiving pot presently in use is susceptible to failure due to abrasion wear. Applicants have devised a process and an apparatus to overcome the shortcomings of the process and apparatus presently in use.

SUMMARY OF THE INVENTION

The invention is a process for use in a wet oxidation system where wastewater and oxygen-containing gas are combined to form a wet oxidation mixture which is pressurized and heated within a pressure vessel to effect wet oxidation treatment. The mixture then flows from said pressure vessel, through cooling means to cool said mixture, then to a pressure control valve which maintains the system at a selected operating pressure. The improvement comprises depressurizing and discharging said cooled oxidation mixture through said pressure control valve into a phase separator vessel of selected length to diameter ratio, said vessel containing a gas phase and a liquid phase. The pressure control valve is positioned to discharge said oxidation mixture at a selected orientation below the surface level of said liquid phase within said vessel, thereby dissipating the energy of the oxidation mixture therein and preventing erosion of said phase separator vessel.

The invention includes an apparatus for carrying out the above process. The apparatus comprises a phase separator vessel having a length to diameter ratio greater than about 1.0, said vessel capable of containing a gas phase and a liquid phase therein. The vessel has an upper exit means for removing said gas phase therefrom, and a lower exit means for removing said liquid phase therefrom. A control means for maintaining said liquid phase at a selected level within said vessel is present. A pressure control valve is positioned at an aperture on said separator vessel, said valve depressurizing and discharging said pressurized and heated wet oxidation mixture at a selected orientation below the selected level of said liquid phase within said vessel. Finally, there is a sealing means for maintaining a fluid-tight seal between said pressure control valve and said separator vessel.

DESCRIPTION OF THE PREFERRED EMBODIMENTS

Figure 1:
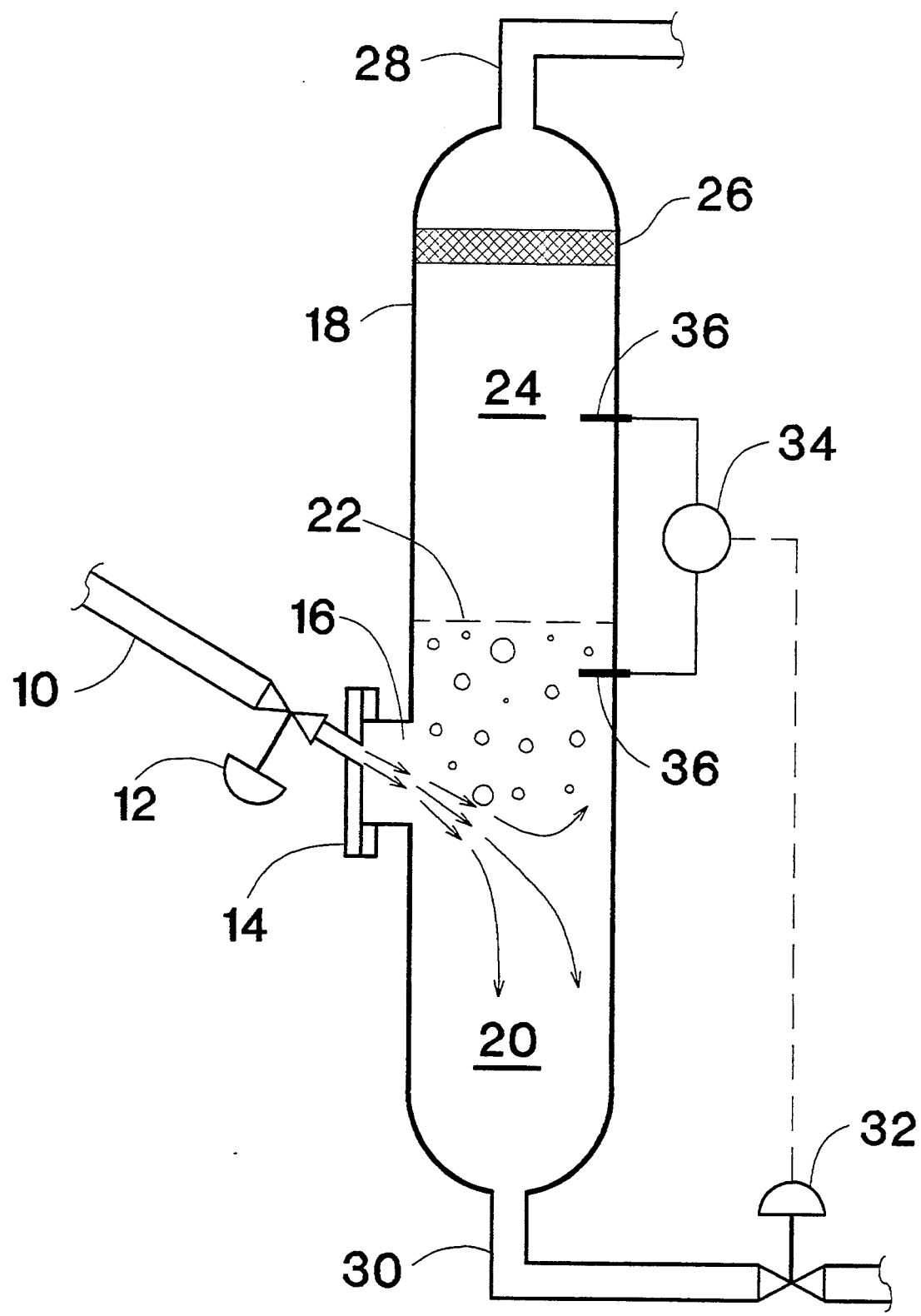
FIG. 1 is a cross sectional view of one embodiment of a hydraulic energy dissipator apparatus for carrying out the process of the present invention.

Referring to FIG. 1, a wet oxidation mixture of wastewater and gases, which has been pressurized and heated to effect wet oxidation treatment, is cooled by flowing from a wet oxidation reactor, through cooling means, such as a process heat exchanger, then enters a conduit 10 controlled by a pressure control valve 12.

The valve 12 maintains the oxidation mixture at the desired system operating pressure, as measured by an upstream pressure monitor (not shown). The pressure control valve 12 has a flange 14 which is fluid-tight sealingly secured to a flanged aperture 16 in a separator vessel 18 such that the oxidation mixture is depressurized directly from said valve 12, through said aperture 16, into said separator vessel, essentially to atmospheric pressure. The vessel 18, in this embodiment of the invention, has a length to diameter ratio of greater than about 1.0, with the longer dimension oriented vertically. Within this vessel is a lower liquid phase 20 with a liquid surface 22 and an upper gas phase 24. The valve 12 and flange 14 are positioned at the flanged aperture 16 in the vessel 18 so the oxidation mixture is discharged in a selected orientation below the surface 22 of the liquid phase to dissipate the energy of the oxidation mixture therein. With the vertically oriented separator vessel 18, the orientation of the oxidation mixture discharge stream is at least about 30° below horizontal, providing a greater overall distance to the opposite wall of the vessel than just the vessel diameter. This orientation allows the liquid phase within the separator vessel 18 to more effectively dissipate the energy of the oxidation mixture and prevent erosion of the vessel wall by that mixture as it discharges. As mentioned above, the pressurized wet oxidation mixture commonly contains three phases, gas, liquid and suspended solids. As the mixture traverses the pressure control valve to a lower pressure environment, the expanding gases (air and steam) give the mixture very high velocity. This gives the more dense liquid and solids portion of the mixture large momentum. The discharge of the mixture below the liquid level in the separator vessel, into a dense liquid medium, allows the liquid in the separator vessel to absorb the momentum of the mixture before the liquid and solids contact the wall of the vessel and cause erosion damage.

Within the liquid phase 20 the gases disengage from the mixture and rise to the upper gas phase 24. The gases flow through a demister 26 which removes droplets of liquid carried by the gases, and exit the separator via an upper gas conduit 28. The volume of the separator vessel 18 for the upper gas phase 24 must be sufficiently large to accommodate the volume of pressurized oxidation gases which expand as they reach reduced pressure conditions in the separator vessel. The separator vessel is generally operated at or near atmospheric pressure, although there may be situations where it is advantageous for the separator to operate at above atmospheric pressure. The lower liquid phase 20 exits the separator via a lower liquid conduit 30 controlled by a level control valve 32. A level controller 34 controls the liquid outlet valve 32 and maintains the liquid surface level 22 within the vessel 18 at a point between two level sensors 36. The surface level is well above the oxidation mixture discharge point into the separator vessel. The liquid within the separator vessel is preferably oxidized wastewater which dissipates the energy of the depressurizing mixture.

Figure 2:
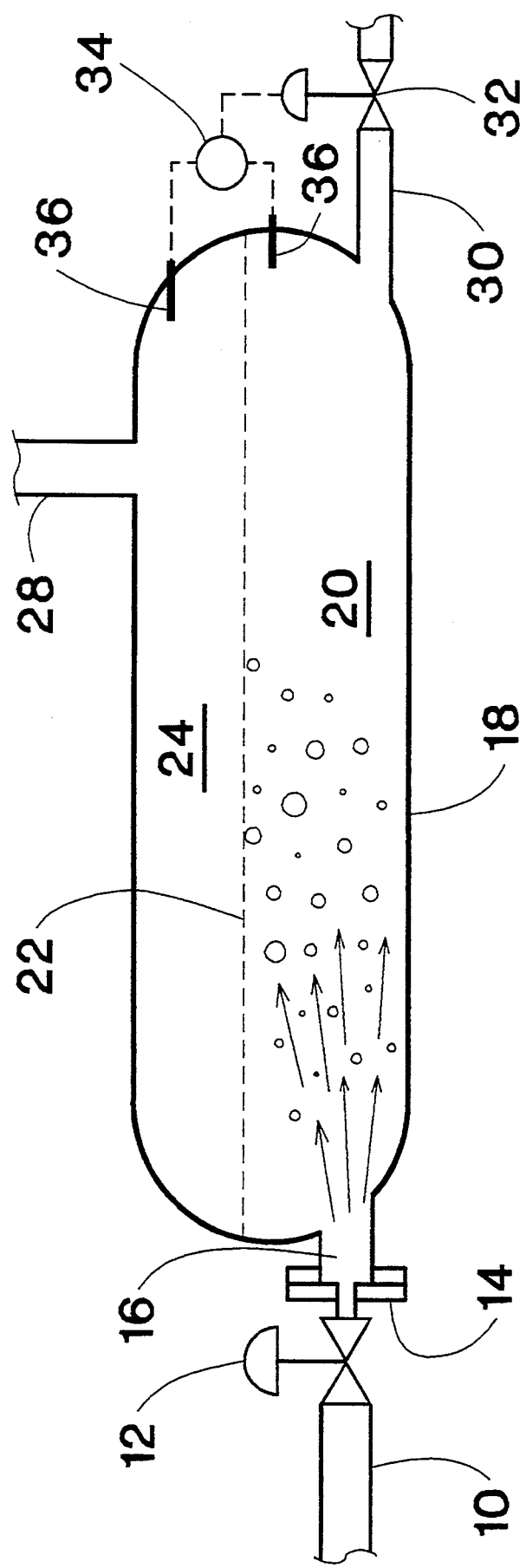
FIG. 2 is a cross sectional view of another embodiment of a hydraulic energy dissipator apparatus for carrying out the process of the present invention.

Referring to FIG. 2, those components in common with FIG. 1 are shown with the same indica. In this embodiment the separator vessel 18 is oriented with the longer dimension horizontal and with the pressure control valve again positioned to discharge below the surface 22 of the liquid phase 20. In this embodiment, the greater width of the liquid phase within the separator vessel allows the pressure control valve discharge stream to be oriented between horizontal and about 30° below horizontal. The liquid phase surface 22 is maintained above the discharge point and between the two level sensors 36, by the level controller 34 and control valve 32 as described above. This orientation likewise allows the liquid phase within the separator vessel 18 to dissipate the energy of the oxidation mixture and prevent erosion of the vessel wall by that mixture as it discharges. The liquid within the vessel is preferably oxidized effluent from the wet oxidation system.

While the invention has been particularly shown and described with reference to a preferred embodiment thereof, it will be understood by those skilled in the art that various changes in form and details may be make therein without departing from the spirit and scope of the invention.

We claim:

1. In a wet oxidation system where wastewater and oxygen-containing gas are combined to form a wet oxidation mixture which is pressurized and heated within a pressure vessel to effect wet oxidation treatment, said mixture then flowing from said pressure vessel, through cooling means to cool said mixture, then to a pressure control valve which maintains the system at a selected operating pressure, the improvement comprising;

depressurizing and discharging said cooled oxidation mixture through said pressure control valve into a phase separator vessel of selected length to diameter ratio, said vessel containing a gas phase and a liquid phase, said pressure control valve positioned to discharge said oxidation mixture at a selected orientation below the surface level of said liquid phase within said vessel, thereby dissipating the energy of the oxidation mixture therein and preventing erosion of said phase separator vessel.

2. A process according to claim 1 wherein said phase separator vessel has a length to diameter ratio greater than about 1.0 and the vessel length is oriented vertically, and wherein said discharging of oxidation mixture from said pressure control valve is oriented at least about 30° below horizontal.

3. A process according to claim 1 wherein said phase separator vessel has a length to diameter ratio greater than about 1.0 and the vessel length is oriented horizontally, and wherein said discharging of oxidation mixture from said pressure control valve is oriented between horizontal and about 30° below horizontal.

4. A process according to claim 1 further comprising maintaining the surface level of said liquid phase within said phase separator vessel above said pressure control valve inlet by a level control means.

5. A process according to claim 1 wherein said liquid phase in said separator vessel is wet oxidized wastewater from said wet oxidation system.

6. A process according to claim 1 wherein said phase separator vessel is maintained at or near atmospheric pressure.

* * * * *